(12) United States Patent
Watanabe (10) Patent No.: US 7,428,006 B2
(45) Date of Patent: Sep. 23, 2008

(54) DIGITAL CAMERA, MOBILE TERMINAL, AND METHOD OF DISPLAYING IMAGES FOR USER CONTROLLED IMAGE CONNECTION

(75) Inventor: Kazumitsu Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 758 days.

(21) Appl. No.: 09/837,342

(22) Filed: Apr. 19, 2001

(65) Prior Publication Data

US 2001/0055070 A1    Dec. 27, 2001

(30) Foreign Application Priority Data

Apr. 21, 2000    (JP)    ............... 2000-121837

(51) Int. Cl.
*H04N 5/225*    (2006.01)

(52) U.S. Cl. .................. 348/218.1; 348/39; 348/38; 348/223.1; 348/333.05; 348/333.01; 348/36

(58) Field of Classification Search ............ 348/333.05, 348/333.01, 36, 39, 38, 218.1, 223.1; 382/294, 382/284

See application file for complete search history.

(56) References Cited

U.S. PATENT DOCUMENTS

| | | | | |
|---|---|---|---|---|
| 5,903,303 | A * | 5/1999 | Fukushima et al. | ........... 348/47 |
| 6,321,024 | B1 * | 11/2001 | Fujita et al. | .................... 386/55 |
| 6,466,262 | B1 * | 10/2002 | Miyatake et al. | ............ 382/284 |
| 6,611,629 | B2 * | 8/2003 | Bender et al. | ................ 382/278 |
| 6,680,749 | B1 * | 1/2004 | Anderson et al. | ....... 348/231.99 |
| 6,720,997 | B1 * | 4/2004 | Horie et al. | .............. 348/218.1 |
| 6,771,304 | B1 * | 8/2004 | Mancuso et al. | .............. 348/39 |
| 7,136,096 | B1 * | 11/2006 | Yamagishi et al. | ........ 348/218.1 |

FOREIGN PATENT DOCUMENTS

| | | |
|---|---|---|
| JP | 10-155109 A | 6/1998 |
| JP | 10-276351 A | 10/1998 |
| JP | 10-290412 A | 10/1998 |
| JP | 11-4400 A | 1/1999 |
| JP | 11-88747 A | 3/1999 |
| JP | 11-196311 A | 7/1999 |
| JP | 11-261882 A | 9/1999 |
| JP | 11-275393 A | 10/1999 |
| JP | 11-355617 A | 12/1999 |

* cited by examiner

*Primary Examiner*—Tuan V Ho
*Assistant Examiner*—Anthony J Daniels
(74) *Attorney, Agent, or Firm*—Oblon, Spivak, McClelland, Maier & Neustadt, P.C.

(57) ABSTRACT

The digital camera includes a photographing unit which picks-up image data, a storage control unit which stores the image data, a reconstruction control unit which reconstructs the stored image data, an image data processing unit which combines the picked-up image data and the reconstructed image data, and stores the produced image data into the recording medium, a display control unit makes a display unit simultaneously display the picked-up image data for monitoring and the reconstructed image data, or makes the display unit display the image data generated by the image data processing unit.

11 Claims, 5 Drawing Sheets

FIG.5

DIGITAL CAMERA, MOBILE TERMINAL, AND METHOD OF DISPLAYING IMAGES FOR USER CONTROLLED IMAGE CONNECTION

FIELD OF THE INVENTION

The present invention relates to a digital camera capable of displaying a monitor image. More particularly, this invention relates to a digital camera capable of displaying image data (or datum) stored in a recording medium.

BACKGROUND OF THE INVENTION

Conventionally, in digital cameras, image data picked-up with an inbuilt photographing section is displayed on a monitor at a recording mode when an image datum is stored(recorded) in a recording medium. The digital camera displays an image so that the mode when an image datum recorded in the recorded medium is changed over to a reproduction mode. Further, a photographer depends on his/her own sense in such a conventional digital camera when obtaining each of image data in order to combine a plurality of image data after photographing. When combining the image data after photographed by the digital camera, whose object has already been stored in a recording device, the image data will be transferred to a personal computer (hereinafter, referred as "PC") thereby combining the image data with PC. However, following steps are required in such a conventional digital camera when combining image data. Namely, after an object is photographed and recorded, the image data are transferred from the digital camera to a computer or a personal computer (PC), and the image data are combined. Therefore, it is not easy to obtain desired combined image data. Additionally, a troublesome operation will occur.

SUMMARY OF THE INVENTION

It is an object of the present invention is to provide a digital camera capable of obtaining a desired combined image data without the need of the PC. It is a further object of this invention to provide a digital camera capable of obtaining a desired combined image data by a single photographing operation without the need of the PC.

The digital camera according to one aspect of this invention has a photographing unit which photographs an image to obtain image data, a storage control unit which stores the image data as an image data file in a predetermined manner, a reconstruction control unit which reconstructs the image data stored in the recording medium, an image data processing unit which combining the image data obtained by the photographing unit with the image data reconstructed by the reconstruction control unit to produce image data and stores the produced image data into the recording medium, a display control unit which makes a display device display the image data obtained by the photographing unit for monitoring and simultaneously has the image data from the reconstruction control unit displayed on the display device or which makes the display device display the image data obtained by the image data processing unit, and an operational instruction input unit which provides an operational instruction signal to the photographing unit, the storage control unit, the image data processing unit, and the display control unit.

The digital camera according to another aspect of this invention a photographing unit which picks-up an image and obtain image data, a storage control unit which stores the image data as an image data file in a predetermined manner, a reconstruction control unit which reconstructs the image data stored in the recording medium, an image data processing unit which combines the image data obtained by the photographing unit with the image data reconstructed by the reconstruction control unit to produce image data and stores the produced image data into the recording medium, a display control unit which makes a display device display the image data obtained by the photographing unit for monitoring and simultaneously has the image data from the reconstruction control unit displayed on the display device or which makes the display device display the image data processed by the image data processing unit, and an operational instruction input unit which provides an operational instruction signal to the photographing unit, the storage control unit, the image data processing unit, and the display control unit. In this digital camera, the photographing unit has a plurality of CCDs and can simultaneously pick-up images of a plurality of objects. Furthermore, the display control unit can make the display device simultaneously display the plurality of image data obtained by the photographing unit.

Other objects and features of this invention will become understood from the following description with reference to the accompanying drawings.

DESCRIPTION OF THE PREFERRED EMBODIMENTS

Preferred embodiments of the present invention will be explained in detail below by referring to the accompanying drawings.

Figure 1:
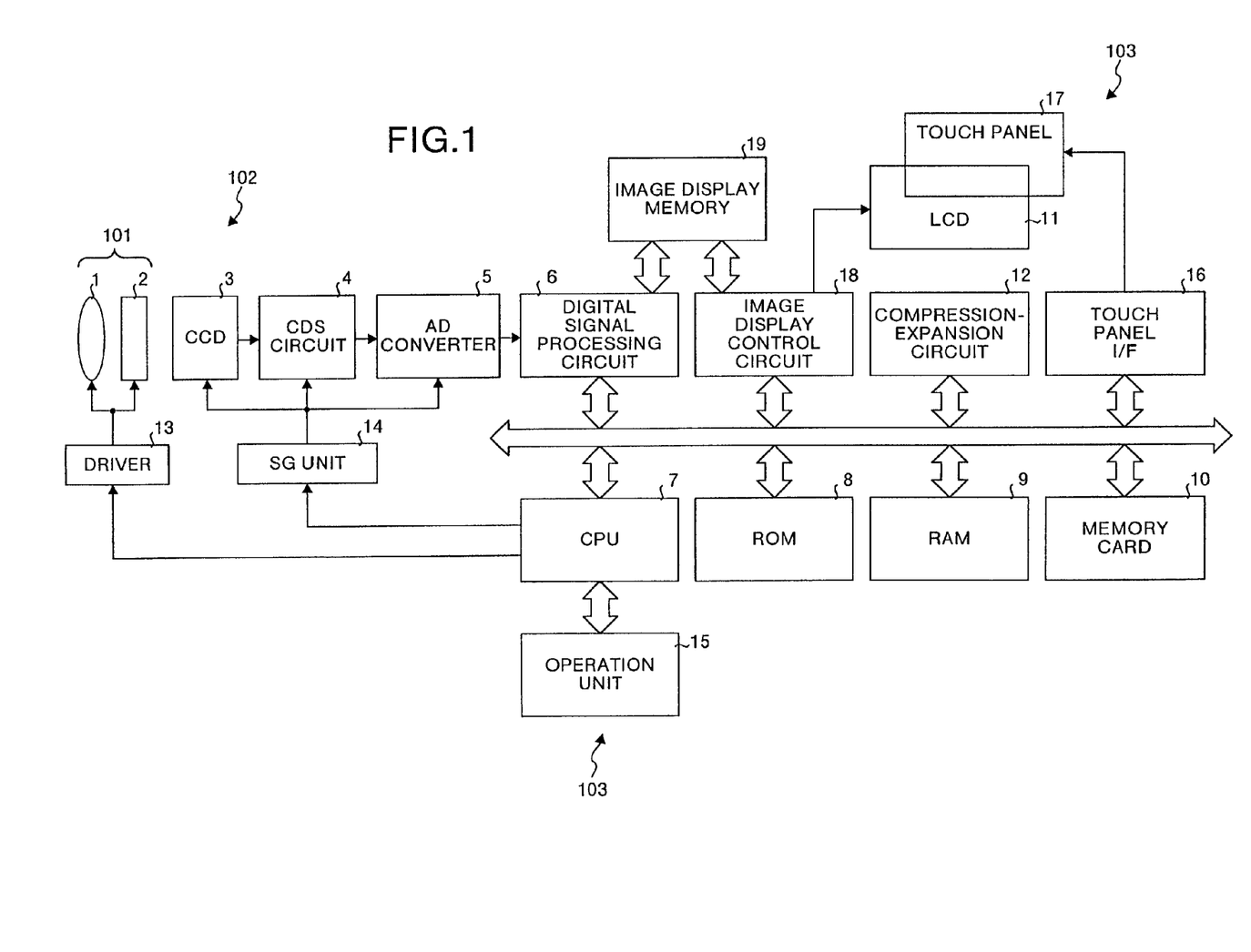
FIG. 1 shows a block diagram of a digital camera according to a first embodiment of the present invention.

FIG. 1 shows a block diagram of a digital camera according to a first embodiment of the present invention. This digital camera comprises lens 1, mechanical system 2 including auto focus device, CCD (charge-coupled device) 3, CDS (correlation duplication sampling) circuit 4, AD converter 5, digital signal processing circuit 6, CPU 7, ROM 8, RAM 9, memory card 10, LCD (display apparatus) 11, compression and expansion circuit 12, driver 13, control signal generation unit ("SG") unit 14, operation unit 15, touch panel interface 17, image display control circuit 18, image display memory 19 and the like.

The CCD 3 receives light from an object through the lens 1. The CDS circuit 4 is connected to the CCD 3. The AD converter 5 is connected to the CDS circuit 4. The digital signal processing circuit 6 is connected to the AD converter 5. The CPU 7 is connected to the digital signal processing circuit 6, ROM 8, RAM 9, memory card (memory medium) 10, compression and expansion circuit 12, touch panel interface 16, and image display control circuit 18 by way of bus 20. Further, the CPU 7 is connected to the driver 13, SG unit 14, and operation unit 15. The image display memory 19 is connected to the digital signal processing circuit 6 and the image display control circuit 18. The LCD 11 is connected to the image display control circuit 18. The touch panel 17 is connected to the bus 20 in way of the touch panel interface 16.

Mechanical system 2, including the lens 1, auto focus apparatus (not shown), stop member (not shown), and filter unit (not shown), constitutes the lens unit 101. The driver 13 controls the lens unit 101 based on a control signal supplied from the CPU 7. The CCD 3 converts the image light input through the lens unit 101 to an electric signal (an analog image datum). The lens unit 101 and the CCD 3 constitute photographing section 102, which picks-up image data. The CDS circuit 4 eliminates noise in image data from the CCD 3. Further, the AD converter 5 converts the analog image data input from the CCD 3 by way of the CDS circuit 4 to digital image data.

Namely, analog image data from the CCD 3 are converted into digital image data at an optimum sampling frequency (e.g., a sub-carrier frequency of NTSC signal multiplied by an integral number) by the AD converter 5 by way of the CDS circuit 4. The SG unit 14 generates a control signal to be used in the CCD 3, CDS circuit 4, and AD converter 5 based on a control signal supplied from the CPU 7. The SG unit 14 provides this signal to the CCD 3, CDS circuit 4, and AD converter 5. Further, the digital signal processing circuit 6 divides the image data inputted from AD converter 5 into color difference data and luminance data to perform various processes, i.e. perform data process such as correction, compression or expansion of an image.

The image compression and expansion circuit 12 performs processing such as orthogonal transformation and inverse orthogonal transformation. These processes are image compression and expansion in conformity with the JPEG. The compression and expansion circuit 12 performs Huffman coding/decoding and the like. These processes are image compression and expansion in conformity with the JPEG. The ROM 8 stores a control program to be used by the CPU 7. The RAM 9 temporarily stores the image data to be used by the CPU 7.

The memory card 10 stores image data compressed by the image compression and expansion circuit 12 in the form of a data file. The image display control circuit 18 makes the LCD 17 display an image for monitoring ("monitor image") a reconstructed image. The image display control circuit 18 makes the LCD 17 display the monitor image and the reconstructed image. The image display control circuit 18 makes the LCD 17 display a state of digital camera in which a monitor image is adapted such as a mode display and an error display having already been set.

The operation unit 15 is provided with at least one button for inputting various parameters or information. The input may include selection of functions, such as start or end of photographing. The touch panel 16 outputs a portion of coordinates which is touched with a touch pen or the like. The operation unit 15 and the touch panel 16 constitute the operational instruction inputting section 103 which inputs various operational instruction signals.

Figure 2:
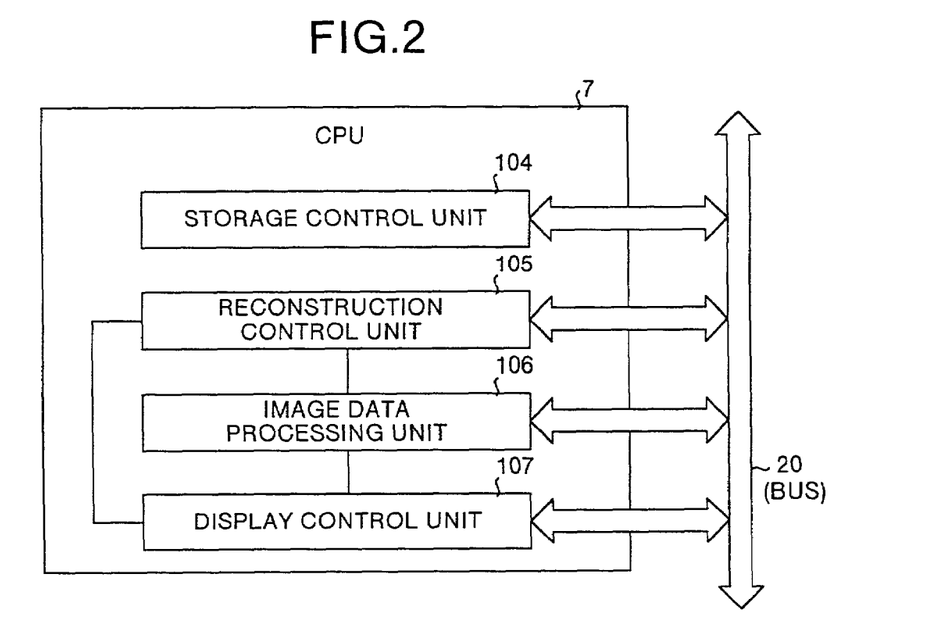
FIG. 2 shows construction of a CPU of the digital camera according to the first embodiment.

FIG. 2 shows a block diagram of construction of the CPU 7. The CPU 7 is at least provides with the storage control unit 104, reconstruction control unit 105, image data processing unit 106, and display control unit 107. The storage control unit 104, reconstruction control unit 105, image data processing unit 106, and display control unit 107 are connected to the digital signal processing circuit 6, ROM 8, RAM 9, memory card 10, compression and expansion circuit 12, touch panel interface 16 and image display control circuit 18 by way of bus 20.

The storage control unit 104 stores the image data obtained by the photographing section 102 in a predetermined manner in the form of a data file. The reconstruction control unit 105 controls reconstruction operation of image data file stored in the memory card 10 to reconstruct image data. The image data processing unit 106 combines the image data picked-up by the photographing section 102 with image data reconstructed by the reconstruction control unit 105 and produces image data to have image data stored into memory card 10. The image data processing unit 106 also combines a plurality of image data stored in memory card 10 to produce image data to have image data stored into memory card 10. The display control unit 107 makes image data obtained by the photographing section 102 and image data reconstructed by the reconstruction control unit 105 display onto the LCD 11. Alternatively, display control unit 107 makes an image datum from image data processing unit 106 display onto the LCD 11. The image data processing unit 106 can perform swing and/or tilt correction or color correction when combining image data which have already been stored in memory card 10.

The CPU 7 executes operations of storage control unit 104, reconstruction control unit 105, image data processing unit 106, and display control unit 107 corresponding to various operational instruction signals from operational instruction inputting section 103.

The operational instruction inputting section 103 can designate a portion where image data are to be displayed in a combined manner. In response to this designation, the image data processing unit 106 combines a plurality of image data to make the data stored in the memory card 10. The display control unit 107 makes the combined image data display onto the LCD 11. The operation instruction inputting section 103 designates the image data in enlarged or reduced manner. In response to this designation, the image data processing unit 106 combines a plurality of image data to store the combined one onto the memory card 10 and make the display control unit 107 display the combined image onto the LCD 11.

Figure 3:
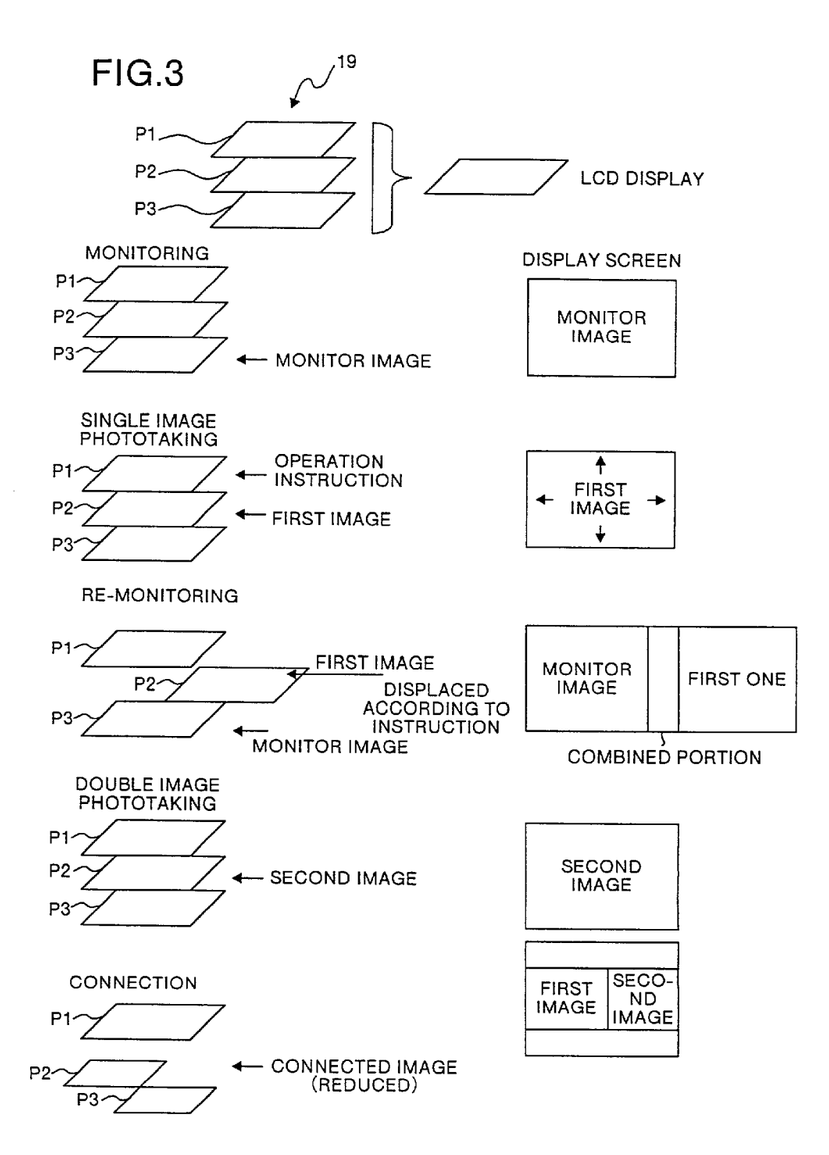
FIG. 3 is for explaining how the digital camera of the first embodiment combines two image data and stores the image data.

FIG. 3 illustrates how the digital camera of the first embodiment combines two image data and stores the image data. Operation for combining and storing two image data will be explained based on FIG. 1, FIG. 2 and FIG. 3.

The image display memory 19 includes many logical planes P1, P2, and P3. The image display control circuit 18 can display an image by overlapping these planes P1, P2, and P3. The image display control circuit 18 executes control of information such as the position to be display, magnification, luminosity, and a transparency distribution by each of planes P1, P2, and P3 when overlapping them.

Image information from object through lens 1 is converted to an electric signal (analog image data) by the CCD. Thereafter, the converted signal is supplied to the AD converter 5 by way of the CDS circuit 4. Thus, the analog image data is converted to digital image data with this AD converter 5.

The digital image data from AD converter 5 is signal-processed by the digital signal processing circuit 6. The signal-processed image data are written into the plane P1 of image display memory 19. The written data are displayed on the LCD 11. Monitor display on the LCD 11 is renewed at a predetermined interval. The display may be renewed for example fifteen frames per second.

If a photographer pushes a release, a single image data are stored in the RAM 9 by way of the CPU 7 and bus 20. Image data stored in the RAM 9 are written onto the plane P2 of the image display memory 19 by way of the image display control circuit 18. As a result, a first obtained still image is displayed on the LCD 11. Thereby operational instruction is written into the plane P3 thereafter performing overlapping and performing display operation. Next, the photographer provides instructions as to the second combined position (connection position), operating the touch panel 16. In response to this instructions, display control unit 107 moves a display portion of the plane P2 corresponding to the instructions.

If monitor operation is restarted, a portion of a first image data and the image data displayed on the monitor are combined resulting in displaying the combined image on the LCD 11. The photographer confirms a connection portion in the first image data and photographs an image, watching the monitor image of the second image. If the release button is pressed, the second image data is stored in the RAM 9 by way of the CPU 7, and bus 20.

Two image data are combined (connected) in the RAM 9. The combined image is input as a single image to the compression and expansion circuit 12 for compression. The compressed image is stored into the RAM 9. The image data processing unit 106 can perform color correction, such as γ-correction, brightness, contrast, and hue, when combining two or more image. The image data processing unit 106 can also perform correction of deformation of image such as correction owing to swing and/or tilt, inclination, and distortion. When compression by the compression and expansion circuit 12 is completed, the CPU 7 transfers the compressed image data from the RAM 9 to the memory card 10 by way of the bus 20 to be stored in a predetermined manner.

Figure 4:
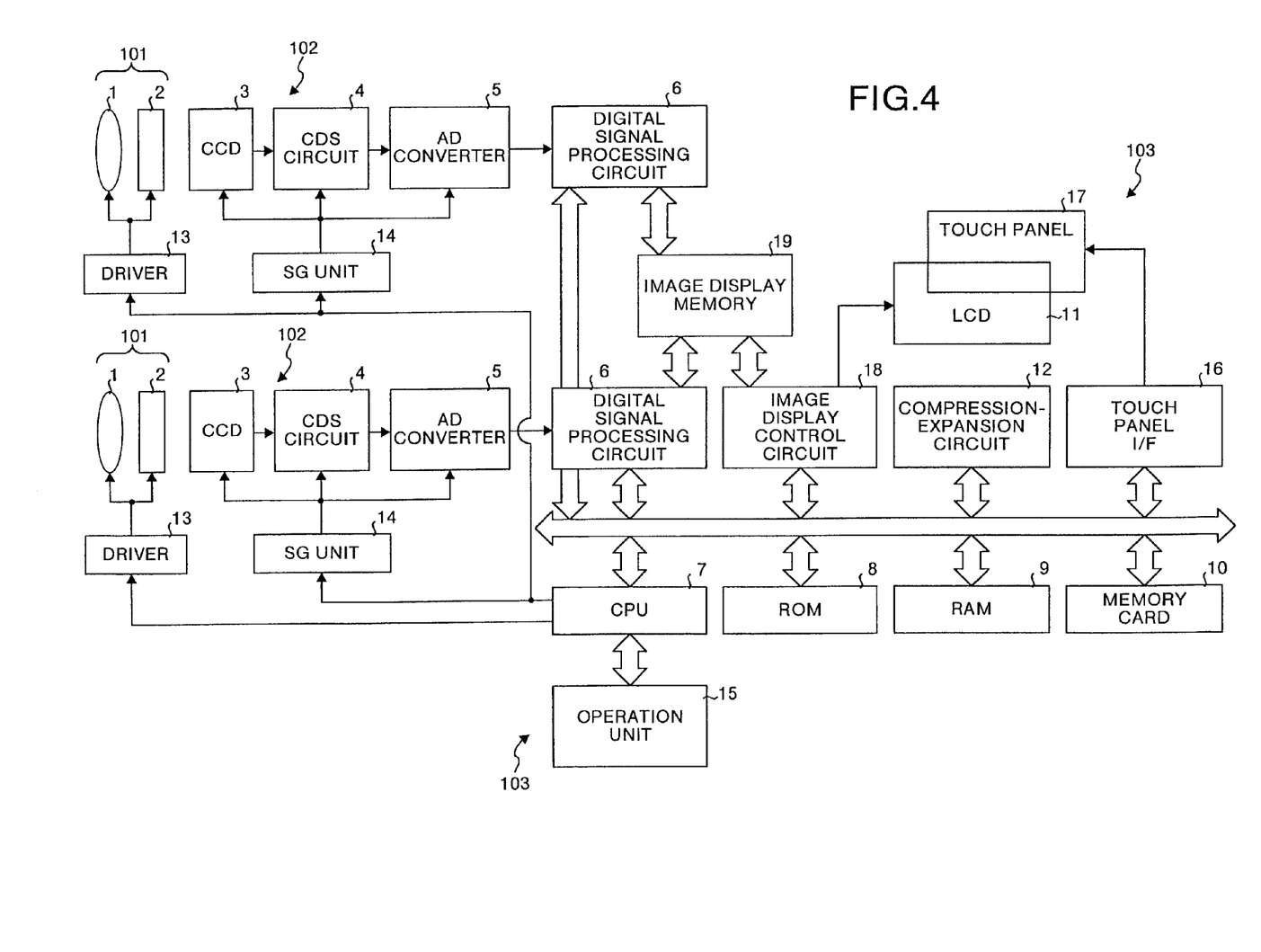
FIG. 4 shows a block diagram of a digital camera according to a second embodiment.
Figure 5:
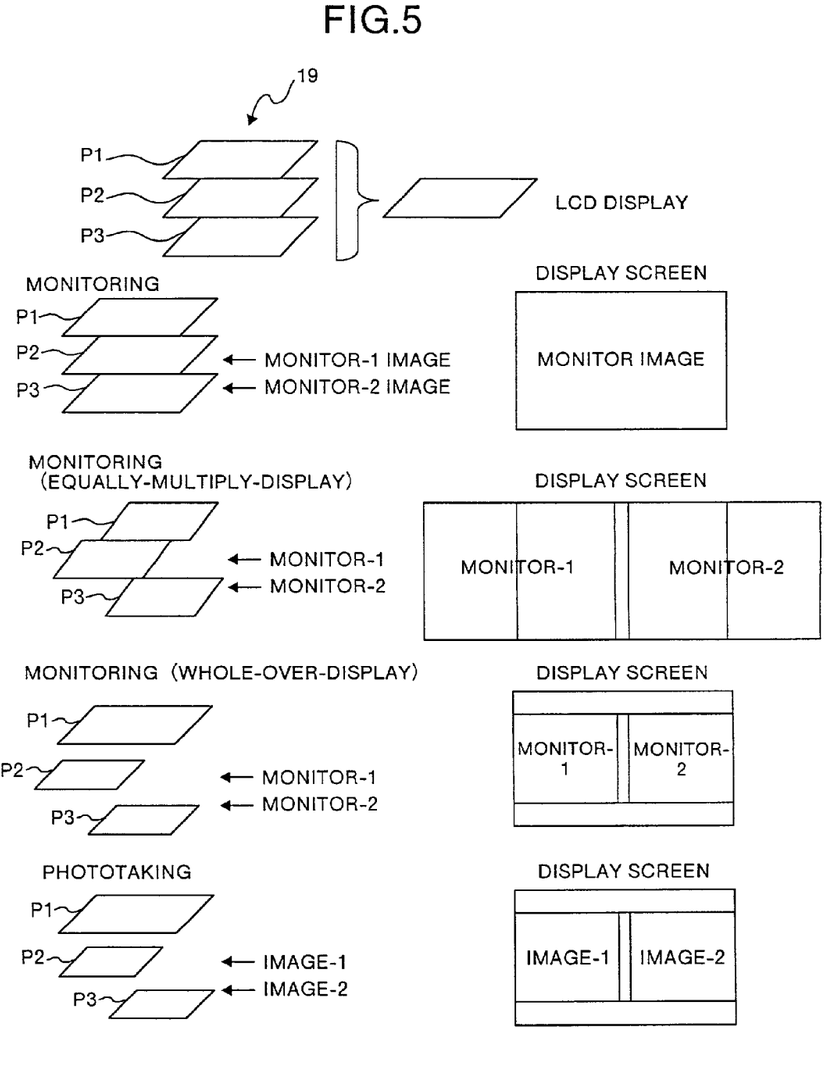
FIG. 5 is for explaining how the digital camera of the second embodiment combines two image data and stores the image data.

A digital camera according to the second embodiment will be explained with reference to FIG. 4 and FIG. 5. FIG. 4 shows a block diagram of the digital camera according to the second embodiment. FIG. 5 illustrates how the digital camera of the second embodiment combines two image data and stores the image data. The sections in FIG. 4 that perform same or similar functions as the sections shown in FIG. 1 are provided with same reference numerals and, to avoid repetition, their explanation is omitted.

The digital camera according to the second embodiment includes the following sections in addition to the sections of the digital camera according to the first embodiment. That is, this digital camera additionally includes lens 1, mechanical system 2 including auto focus system, CCD 3, CDS circuit 4, AD converter 5, digital signal processing circuit 6, driver 13, and SG unit 14. Namely, this digital camera is provided with two lenses 1, two mechanical systems 2, two CCDs 3, two CDS circuits 4, two AD converters 5, two digital signal processing circuits 6, two drivers 13, and two SG units 14. This digital camera also includes CPU 7, ROM 8, RAM 9, memory card 10, LCD 11, compression and expansion circuit 12, operation unit 15, touch panel interface 16, touch panel 17, image display control circuit 18, and image display memory 19. The CPU 7 in the second embodiment has the same structure as the CPU 7 in the first embodiment except for it can simultaneously process two images.

The lens units 101 can be moved independently. A photographing direction can be adjusted therebetween. Image information obtained from each lens unit 101 is separately processed by corresponding digital signal processing circuit 6. The processed image information are written into plane P1 and plane P2 in image display memory 19.

The LCD 11 displays image data from both of CCDs 3 for monitoring. An overlapping position with relative to display positions of planes P1 and P2 is controlled. The image data thereof are displayed as a combined image. Then, an overlapping position corresponds to the display positions of planes P1 and P2, so that a combination of two image data can be performed at the time of monitoring the image data. Each digital signal processing circuit 6 performs digital signal processing independently to the corresponding image data, so that color correction can be performed independently therewith, too. Each digital signal processing circuit 6 can independently set a zooming ratio, shutter speed, exposure correction, and white balance or the like for the corresponding image data.

If the photographer presses the release button, the image data are stored into the RAM 9 from both of the digital signal processing circuits 6. Data obtained in RAM 9 can be stored in the form of independent image files in the memory card 10. After obtaining two image data, connection therebetween as above-mentioned process is performed, and a single image file thereby can be stored.

Optionally, when the display control unit 107 makes the LCD 11 simultaneously display a plurality of image data picked-up by the photographing section 102 for monitoring, the image data processing unit 106 can combine a plurality of image data. Further, image data processing unit 106 can perform color correction with respect to each image data. Furthermore, the image photographing sections 102 can simultaneously obtain images of the same object at different zooming ratios. Furthermore, the image photographing sections 102 can simultaneously obtain images of the same object at different exposures.

The digital camera according to the two embodiments described above may be incorporated in a mobile terminal such as PAM.

Thus, according to the present invention, image data picked-up by the photographing unit and the image data reconstructed by the reconstruction control unit are displayed on the display device, or image data processed by the image data processing unit are displayed on the display device. As a result, a desired number of images can be combined easily without the need of the personal computer.

Furthermore, the photographing unit includes a plurality of CCDs. Thereby the photographing unit can pick-up a plurality of images of the same or different objects. Furthermore, the display control unit simultaneously makes the display device display the plurality of images of the same or different objects. Also, the image data processing unit can combine the plurality of image data. As a result, a desired number of images can be combined easily without the need of the personal computer.

The present document incorporates by reference the entire contents of Japanese priority document, 2000-121837 filed in Japan on Apr. 21, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera comprising:
 a photographing unit which picks-up an image and obtains image data;
 a storage control unit which stores the image data in the form of an image data file in a predetermined manner in a recording medium;
 a reconstruction control unit which reconstructs the image data stored in said recording medium;
 an image data processing unit which combines the image data picked-up by said photographing unit and the image data reconstructed by said reconstruction control unit to produce an image data, and makes said recording medium store the produced image data;

a display unit which displays the images;

a display control unit which makes said display unit simultaneously display the image data obtained by said photographing unit for monitoring and the image data reconstructed by said reconstruction control unit, or which makes said display unit display the image data produced by said image data processing unit; and an operational instruction inputting unit which provides operational instruction signals to said photographing unit, said storage control unit, said image data processing unit, and said display control unit;

wherein said photographing unit includes a plurality of CCDs which simultaneously pick-up an image of same or a plurality of objects and obtain a plurality of image data, said display control unit can make said display unit simultaneously display the plurality of image data obtained by said photographing unit, and said operation instruction signals include translation instructions input by a user to move a first image with respect to the image data obtained by said photographing unit for monitoring after the first image and the image data obtained by said photographing unit for monitoring are displayed by the display unit, said image data obtained by said photographing unit for monitoring being most recent image data measured by said photographing unit, and wherein said photographing unit can simultaneously obtain a plurality of images of the same object at different exposure values.

2. The digital camera according to claim 1, wherein said image data processing unit can combine a plurality of image data when simultaneously displaying the plurality of the image data on said display control unit.

3. The digital camera according to claim 1, wherein said image data processing unit can perform color correction for each of the plurality of image data.

4. The digital camera according to claim 1, wherein said photographing unit can simultaneously obtain a plurality of images of the same object at different zooming ratios.

5. The digital camera according to claim 1, wherein said photographing unit can simultaneously obtain a plurality of images of the same object at different shutter speed.

6. The digital camera according to claim 1, wherein said photographing unit can simultaneously obtain a plurality of images of the same object at different white balance values.

7. A digital camera comprising:

photographing means for picking-up an image and obtains image data;

storage control means for storing the image data in the form of an image data file in a predetermined manner in a recording medium;

reconstruction control means for reconstructing the image data stored in said recording medium;

image data processing means for combining the image data picked-up by said photographing means and the image data reconstructed by said reconstruction control means to produce an image data, and makes said recording medium store the produced image data;

display means for displaying the image data;

display control means for making said display means simultaneously display the image data obtained by said photographing means for monitoring and the image data reconstructed by said reconstruction control means, or making said display means display the image data produced by said image data processing means; and operational instruction inputting means for providing operational instruction signals to said photographing means, said storage control means, said image data processing means, and said display control means, wherein said photographing means includes a plurality of image pick-up means which simultaneously pick-up an image of same or a plurality of objects and obtain a plurality of image data, said display control means can make said display means simultaneously display the plurality of image data obtained by said photographing means, and said operation instruction signals include translation instructions input by a user to move a first image with respect to the image data obtained by said photographing means for monitoring after the first image and the image data obtained by said photographing means for monitoring are displayed by the display means, said image data obtained by said photographing means for monitoring being most recent image data measured by said photographing means, and wherein said photographing means can simultaneously obtain a plurality of images of the same object at different exposure values.

8. A method of displaying images obtained by a digital camera, the method comprising:

simultaneously picking-up a plurality of images of a same or different objects at different exposure values and obtaining image data;

storing the image data in a recording medium;

reconstructing the image data stored in said recording medium;

simultaneously displaying a first image and image data obtained by a photographing unit for monitoring on a display unit, said image data obtained by said photographing unit for monitoring being most recent image data measured by said photographing unit;

translating the first image with respect to the image data obtained by said photographing unit for monitoring after the first image and the image data obtained by said photographing unit for monitoring are displayed by the display unit;

combining the picked-up image data and the reconstructed the image data to produce a combined image data, and storing the combined image data in said recording medium; and simultaneously displaying on a display of said digital camera a plurality of images corresponding to the picked-up image data for monitoring and the reconstructed image data, or displaying on a display of said digital camera the combined image data.

9. A mobile terminal comprising:

a photographing unit which picks-up an image and obtains image data;

a storage control unit which stores the image data in the form of an image data file in a predetermined manner in a recording medium;

a reconstruction control unit which reconstructs the image data stored in said recording medium;

an image data processing unit which combines the image data picked-up by said photographing unit and the image data reconstructed by said reconstruction control unit to produce an image data, and makes said recording medium store the produced image data;

a display unit which displays the images;

a display control unit which makes said display unit simultaneously display the image data obtained by said photographing unit for monitoring and the image data reconstructed by said reconstruction control unit, or which makes said display unit display the image data produced by said image data processing unit; and an operational instruction inputting unit which provides operational instruction signals to said photographing unit, said storage control unit, said image data processing unit, and said display control unit;

wherein said photographing unit includes a plurality of CCDs which simultaneously pick-up an image of same or a plurality of objects and obtain a plurality of image data, said display control unit can make said display unit simultaneously display the plurality of image data obtained by said photographing unit, and said operation instruction signals include translation instructions input by a user to move a first image with respect to the image data obtained by said photographing unit for monitoring after the first image and the image data obtained by said photographing unit for monitoring are displayed by the display unit, said image data obtained by said photographing unit for monitoring being most recent image data measured by said photographing unit, and wherein said photographing unit can simultaneously obtain a plurality of images of the same object at different exposure values.

10. A digital camera comprising:

a photographing unit which picks-up a first and a second image and obtains first and second image data;

a storage control unit which stores the first and second image data in the form of image data files in a predetermined manner in a recording medium;

a reconstruction control unit which reconstructs the first and second image data stored in said recording medium;

an image data processing unit which combines the first and second image data picked-up by said photographing unit and the image data reconstructed by said reconstruction control unit to produce an image data, and makes said recording medium store the produced image data;

a display unit which displays the images;

a display control unit which makes said display unit simultaneously display image data obtained by said photographing unit for monitoring and the image data reconstructed by said reconstruction control unit, or which makes said display unit display the image data produced by said image data processing unit; and an operational instruction inputting unit which provides operational instruction signals to said photographing unit, said storage control unit, said image data processing unit, and said display control unit;

wherein said photographing unit includes a plurality of CCDs which simultaneously pick-up an image of same or a plurality of objects and obtain a plurality of image data, said display control unit can make said display unit simultaneously display the plurality of image data obtained by said photographing unit, and said operation instruction signals include translation instructions input by a user to move first image data obtained by said photographing unit for monitoring with respect to second image data obtained by said photographing unit for monitoring after the first image data and the second image data are displayed by the display unit, said first image data obtained by said photographing unit for monitoring being most recent image data measured by a first CCD in said photographing unit and said second image data obtained by said photographing unit for monitoring being most recent image data measured by a second CCD in said photographing unit.

11. A method of displaying images obtained by a digital camera, the method comprising:

simultaneously picking-up a plurality of images of a same or different objects and obtaining image data;

storing the image data in a recording medium;

reconstructing the image data stored in said recording medium;

simultaneously displaying first image data obtained by a photographing unit for monitoring and second image data obtained by a photographing unit for monitoring on a display unit, said first image data obtained by said photographing unit for monitoring being most recent image data measured by a first CCD in said photographing unit and said second image data obtained by said photographing unit for monitoring being most recent image data measured by a second CCD in said photographing unit;

translating the first image data with respect to the second image data after the first image data and the second image data are displayed by the display unit;

combining the picked-up image data and the reconstructed the image data to produce a combined image data, and storing the combined image data in said recording medium; and simultaneously displaying on a display of said digital camera a plurality of images corresponding to the picked-up image data for monitoring and the reconstructed image data, or displaying on a display of said digital camera the combined image data.

* * * * *